United States Patent
Lin et al.

(10) Patent No.: US 9,684,205 B2
(45) Date of Patent: Jun. 20, 2017

(54) DISPLAY PANEL AND MANUFACTURING METHOD THEREOF

(71) Applicant: Au Optronics Corporation, Hsinchu (TW)

(72) Inventors: Chen-Chun Lin, Hsinchu (TW); Tien-Lun Ting, Taichung (TW); Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/864,918

(22) Filed: Sep. 25, 2015

(65) Prior Publication Data

US 2017/0010489 A1    Jan. 12, 2017

(30) Foreign Application Priority Data

Jul. 9, 2015   (TW) .............................. 104122248 A

(51) Int. Cl.
| | | |
|---|---|---|
| *C09K 19/00* | (2006.01) | |
| *G02F 1/1337* | (2006.01) | |
| *G02F 1/1341* | (2006.01) | |

(52) U.S. Cl.
CPC .......... *G02F 1/1337* (2013.01); *G02F 1/1341* (2013.01); *G02F 1/133788* (2013.01); *Y10T 428/10* (2015.01); *Y10T 428/1005* (2015.01)

(58) Field of Classification Search
CPC ............. G02F 1/1337; G02F 1/133788; G02F 1/133707; G02F 1/1341; G02F 2001/133742; G02F 2001/133776; C09K 2019/0448; Y10T 428/10; Y10T 428/1005
USPC .......... 428/1.1, 1.2; 349/123, 127, 130, 183, 349/191; 252/299.4, 299.5
See application file for complete search history.

(56) References Cited

U.S. PATENT DOCUMENTS

| | | |
|---|---|---|
| 2005/0030445 A1 | 2/2005 | Inoue et al. |
| 2014/0231711 A1* | 8/2014 | Zhong .................. C09K 19/062 252/299.5 |

FOREIGN PATENT DOCUMENTS

CN      102732265      10/2012

* cited by examiner

*Primary Examiner* — Ruiyun Zhang
(74) *Attorney, Agent, or Firm* — Jianq Chyun IP Office

(57) ABSTRACT

A display panel including a first substrate, a pixel array disposed on the first substrate, a first alignment layer covering the pixel array, a second substrate disposed opposite the first substrate, a second alignment layer disposed on the second substrate and a display medium disposed between the first alignment layer and the second alignment layer is provided. The first alignment layer has first alignment particles. A number of the first alignment particles each having an area ranged from 250 nm$^2$ to 1000 nm$^2$ occupies 40% or less of a total number of the first alignment particles in a unit area. The second alignment layer has second alignment particles. A number of the second alignment particles each having the area ranged from 250 nm$^2$ to 1000 nm$^2$ occupies 40% or less of a total number of the second particles in the unit area.

10 Claims, 4 Drawing Sheets

DISPLAY PANEL AND MANUFACTURING METHOD THEREOF

CROSS-REFERENCE TO RELATED APPLICATION

This application claims the priority benefit of Taiwan application serial no. 104122248, filed on Jul. 9, 2015. The entirety of the above-mentioned patent application is hereby incorporated by reference herein and made a part of this specification.

BACKGROUND OF THE INVENTION

Field of the Invention

The invention relates to an electronic apparatus, and more particularly, to a display panel.

Description of Related Art

Conventionally, the multi-domain vertically aligned liquid crystal display (MVA) LCD panel utilizes an alignment structure to make liquid crystal molecules in different regions tilt at different angles in order to achieve the effect of wide viewing angle. The alignment structure includes alignment protrusions and alignment slits disposed on pixel electrodes. However, a contrast ratio of the LCD panel may be lowered because of a light leakage usually caused by the disclination of tilting directions of the liquid crystal molecules surrounding the alignment protrusions. Further, even if light-shielding layers are disposed on the alignment protrusions and the alignment slits for reducing the light leakage, an aperture ratio of the LCD panel may be decreased instead. Therefore, a polymer-stabilized alignment (PSA) process has been proposed to solve the issue of the MVA-LCD panel for having the poor contrast ratio.

In the conventional polymer stabilized alignment process, firstly, a reactive monomer is doped in a liquid crystal material to form a display medium composition. Subsequently, the display medium composition is filled between a top substrate and a bottom substrate of the LCD panel. Then, a specific voltage is applied to the display medium composition by a pixel array, and the display medium composition is irradiated by a light ray under the specific voltage so that the reactive monomer can conduct a polymerization to form a polymer-stabilized alignment layer at boundaries between the liquid crystal molecules and the top and bottom substrates. Accordingly, the polymer-stabilized alignment layer can substantially reduce a rising time of the LCD panel (i.e., a time required for a transmittance of the LCD panel to change from 10% to 90%), but a falling time of the LCD panel (i.e., a time required for the transmittance of the LCD panel to change from 90% to 10%) will become longer.

SUMMARY OF THE INVENTION

The invention provides a display panel having a short falling time.

The invention provides a manufacturing method of display panel, which is used to manufacture the display panel having the short falling time.

The display panel of the invention includes a first substrate, a pixel array disposed on the first substrate, a first alignment layer covering the pixel array, a second substrate disposed opposite the first substrate, a second alignment layer disposed on the second substrate and a display medium disposed between the first alignment layer and the second alignment layer. The first alignment layer has a plurality of first alignment particles. A number of the first alignment particles each having an area ranged from 250 $nm^2$ to 1000 $nm^2$ occupies 40% or less of a total number of the first alignment particles in a unit area. The second alignment layer has a plurality of second alignment particles. A number of the second alignment particles each having the area ranged from 250 $nm^2$ to 1000 $nm^2$ occupies 40% or less of a total number of the second particles in the unit area.

The manufacturing method of display panel of the invention includes: forming a pixel array and a first alignment layer on a first substrate; forming a second alignment layer on a second substrate; preparing a display medium composition comprising a positive-type or negative-type liquid crystal material and a reactive monomer capable of conducting a polymerization reaction under an ultraviolet irradiation; assembling the first substrate and the second substrate together, and filling the display medium composition between the first alignment layer of the first substrate and the second alignment layer of the second substrate; conducting a first curing which comprises conducting an irradiation step and applying a first voltage to the pixel array simultaneously; conducting a second curing which comprises conducting an irradiation step so that the reactive monomer conducts the polymerization reaction to form a plurality of first alignment particles on the first alignment layer and form a plurality of second alignment particles on the second alignment layer, wherein a number of the first alignment particles each having an area ranged from 250 $nm^2$ to 1000 $nm^2$ occupies 40% or less of a total number of the first alignment particles in a unit area, and a number of the second alignment particles each having the area ranged from 250 $nm^2$ to 1000 $nm^2$ occupies 40% or less of a total number of the second alignment particles in the unit area.

Based on the above, in a resultant display panel manufactured by using a 2 step curing provided in the manufacturing method of display panel according to an embodiment of the invention, the number of the first alignment particles each having the area ranged from 250 $nm^2$ to 1000 $nm^2$ occupies 40% or less of the total number of the first alignment particles in the unit area, and the number of the second alignment particles each having the area ranged from 250 $nm^2$ to 1000 $nm^2$ occupies 40% or less of the total number of the second alignment particles in the unit area. As a result, the falling time of the display panel is significantly shorter.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
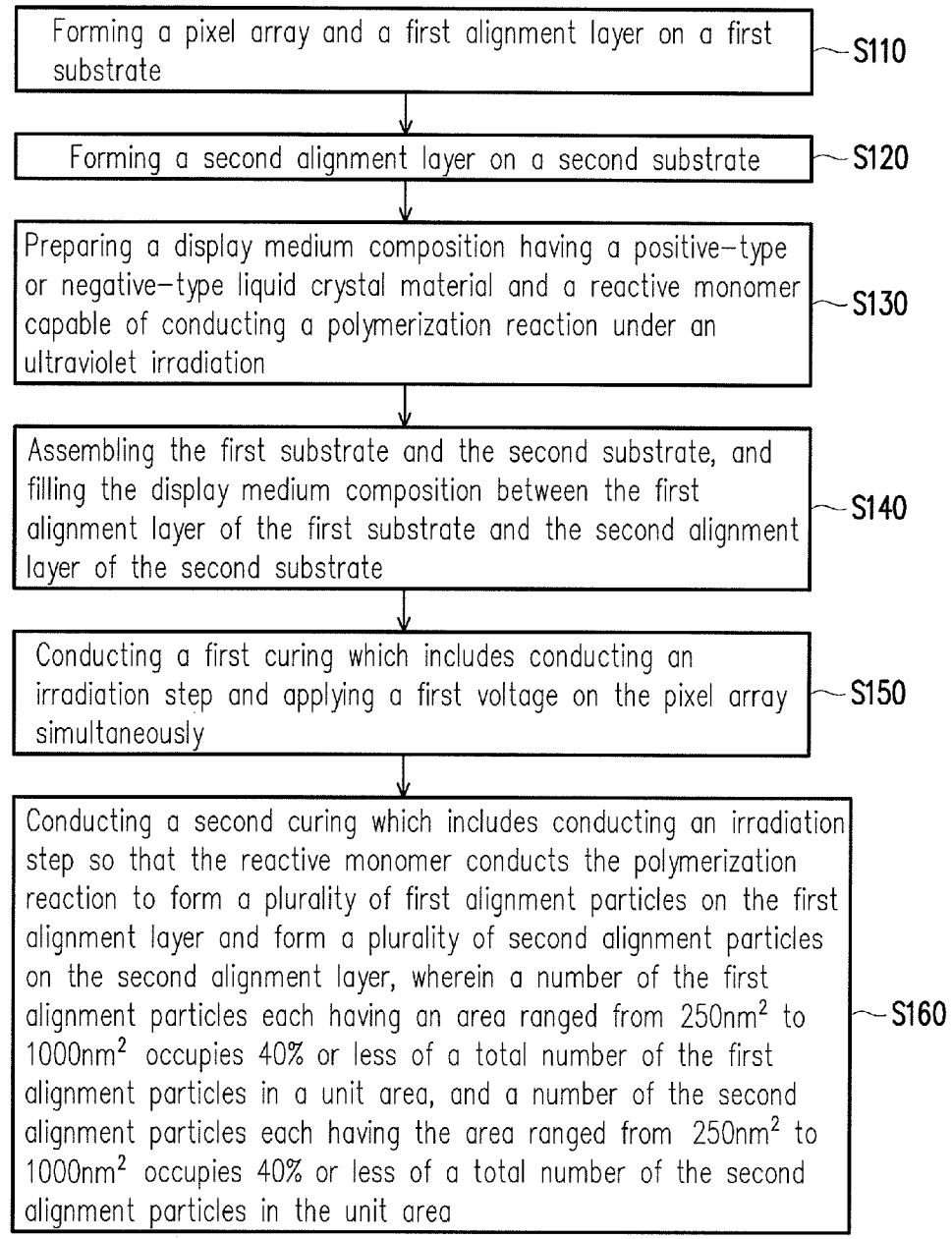
FIG. 1 is a flowchart of a manufacturing method of display panel according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flowchart of a manufacturing method of display panel according to an embodiment of the invention. Referring to FIG. 1, the manufacturing method of display panel includes the following steps. A pixel array and a first alignment layer are formed on a first substrate (step S110); a second alignment layer is formed on a second substrate (step S120); a display medium composition including a positive-type or negative-type liquid crystal material and a reactive monomer capable of conducting a polymerization reaction under an ultraviolet irradiation is prepared (step S130); the first substrate and the second substrate are assembled together, and the display medium composition is filled between the first alignment layer of the first substrate and the second alignment layer of the second substrate (step S140); a first curing is conducted, and the first curing includes conducting an irradiation step and applying a first voltage to the pixel array simultaneously (step S150); a second curing is conducted, and the second curing includes conducting an irradiation step so that the reactive monomer conducts the polymerization reaction to form a plurality of first alignment particles on the first alignment layer and form a plurality of second alignment particles on the second alignment layer, wherein a number of the first alignment particles each having an area ranged from 250 nm$^2$ to 1000 nm$^2$ occupies 40% or less of a total number of the first alignment particles in a unit area, and a number of the second alignment particles each having the area ranged from 250 nm$^2$ to 1000 nm$^2$ occupies 40% or less of a total number of the second alignment particles in the unit area (step S160).

It should be noted that, appropriate changes can be made to an order of aforesaid steps S110 to S130. For instance, steps S130, S120 and S140 to S160 can be sequentially performed after step S110 is performed; steps S110, S130 and S140 to S160 can be sequentially performed after step S120 is performed; steps S130, S110 and S140 to S160 can be sequentially performed after step S120 is performed; steps S110, S120 and S140 to S160 can be sequentially performed after step S130 is performed; or steps S120, S110 and S140 to S160 can be sequentially performed after step S130 is performed.

The manufacturing method of display panel according to an embodiment of the invention is described below with reference to FIG. 2A to FIG. 2D. FIG. 2A to FIG. 2D are cross-sectional diagrams illustrating the manufacturing method of display panel according to an embodiment of the invention. Referring FIG. 2A, first of all, a pixel array A and a first alignment layer PI1 are formed on a first substrate 110. To be specific, firstly, the first substrate 110 is provided. A material of the first substrate 110 may be, for example, a glass, a quartz, an organic polymer, or other suitable materials. Subsequently, the pixel array A may be formed on the first substrate 110 by using a semiconductor fabrication processing technology. The pixel array A at least includes a plurality of active devices (not illustrated), a plurality of pixel electrodes (not illustrated), a plurality of data lines (not illustrated) and a plurality of scan lines (not illustrated). The active devices are, for example, thin film transistors each having a source, a gate and a drain. The data lines are electrically connected to the sources of the active devices. The scan lines are electronically connected to the gates of the active devices. The pixel electrodes are electrically connected to the drains of the active devices. Subsequently, the first alignment layer PI1 is formed on the pixel array A.

In the present embodiment, an alignment liquid may be transferred onto the pixel array A in a manner of roller printing, so as to form the first alignment layer PI1. However, the invention is not limited thereto. In other embodiments, the first alignment layer PI1 may also be formed by using a spinning coating method, a PI inkjet method or other suitable methods. A material of the first alignment layer PI1 is, for example, a polymer containing amide bond and/or imide bond, but the invention is not limited thereto. In other embodiments, the first alignment layer PI1 may also be other suitable materials.

Subsequently, a second alignment layer PI2 is formed on a second substrate 120. A material of the second substrate 120, a method of forming the second alignment layer PI2 and a material of the second alignment layer PI2 are similar to the material of the first substrate 110, the method of forming the first alignment layer PI1 and the material of the first alignment layer PI1 respectively, which are not repeated hereinafter. Subsequently, a display medium composition MX is prepared. The display medium composition MX at least includes a positive-type or negative-type liquid crystal material LC and a reactive monomer RM capable of conducting a polymerization reaction under an ultraviolet irradiation. The reactive monomer RM at least includes a first photosensitive monomer. In the present embodiment, the reactive monomer RM may selectively include a second photosensitive monomer that is different from the first photosensitive monomer. An absorption wavelength of the first photosensitive monomer may selectively be greater than 300 nm, and the first photosensitive monomer is, for example, at least one of Compound I or Compound II as listed in Table 1 below. An absorption wavelength of the second photosensitive monomer is preferably less than 300 nm, but it is also possible that no specific limitations are made to the absorption wavelength of the second photosensitive monomer 143. The second photosensitive monomer is, for example, Compound III as listed in Table 1 below. However, a type of the reactive monomer of the invention is not limited to the above. In other embodiments, the reactive monomer RM may also be composed of other suitable compositions.

TABLE 1

| | Chemical formula | Remark |
|---|---|---|
| Compound I | 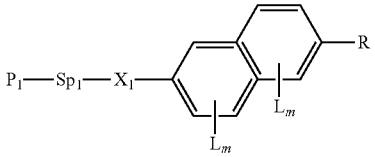 | "L" is a hydrogen atom, a fluorine atom, a chlorine atom, a cyano group, an alkyl group, an alkyl carbonyl group, an alkoxycarbonyl group or an alkylcarbonyloxy group having 1 to 7 carbon atoms, wherein $\geq 1$; "R" is a hydrogen atom, a fluorine atom, a chlorine atom, a cyano group, a thiocyanato group, pentafluoro-lambda~6~-sulfanyl (—SF5H), NO2—, a straight chain or branched chain alkyl group having 1 to 12 carbon atoms, or X2—Sp2—P2 group; "X1" and "X2" are respectively an oxygen atom, a sulfur atom, a methoxy group, a carbonyl group, a carboxyl group, a carbamoyl group, a methylthio group, an ethenylcarbonyl group, a carbonylethenyl group or a single bond; "Sp1" and "Sp2" are straight chain or branched chain alkyl groups having 1 to 8 carbon atoms or single bonds; and "P1" and "P2" are respectively a polymerizable group |
| Compound II | 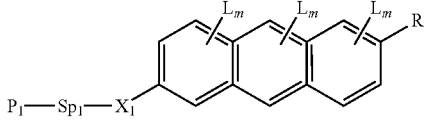 | |
| Compound III | 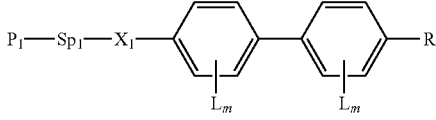 | "L" is a hydrogen atom, a fluorine atom, a chlorine atom, a cyano group, an alkyl group, an alkyl carbonyl group, an alkoxycarbonyl group or an alkylcarbonyloxy group having 1 to 7 carbon atoms, wherein $m \geq 1$; "R" is a hydrogen atom, a fluorine atom, a chlorine atom, a cyano group, a thiocyanato group, pentafluoro-lambda~6~-sulfanyl (—SF5H), NO2—, a straight chain or branched chain alkyl group having 1 to 12 carbon atoms, or X2—Sp2—P2 group; "X1" and "X2" are respectively an oxygen atom, a sulfur atom, a methoxy group, a carbonyl group, a carboxyl group, a carbamoyl group, a methylthio group, an ethenylcarbonyl group, a carbonylethenyl group or a single bond; "Sp1" and "Sp2" are straight chain or branched chain alkyl groups having 1 to 8 carbon atoms or single bonds; and "P1" and "P2" are respectively a polymerizable group |
| Inhibitor | 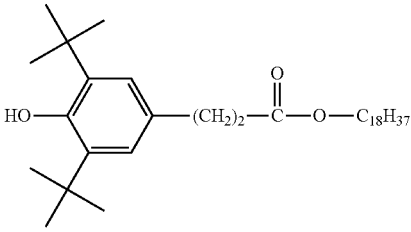 | None |

In the present embodiment, a percent by weight of the reactive monomer RM may be selectively ranged from 0.1% to 1% (e.g., 0.3% or 0.45%, but the invention is not limited thereto) of the display medium composition MX. The percent by weight of the reactive monomer RM may be set to other suitable values based on actual requirements (e.g., an amount of time used in a curing, an irradiation energy in an irradiation step, etc.). In addition, the display medium composition MX may further include an inhibitor IHB. The inhibitor IHB is capable of preventing the reactive monomer RM from conducting the polymerization in advance before the first curing is conducted, so as to improve a stability of the display medium composition MX. A chemical structure formula of the inhibitor IHB is as shown in Table 1 above, but the invention is not limited thereto.

Subsequently, the first substrate 110 and the second substrate 120 are assembled together, and the display medium composition MX is filled between the first alignment layer PI1 of the first substrate 110 and the second alignment layer PI2 of the second substrate 120. For instance, in the present embodiment, firstly, a sealant may be coated on the first alignment layer PI1 of the first substrate 110, or on the second alignment layer PI2 of the second substrate 120. Then, the display medium composition MX is dropped into a space surrounded by the sealant (not illustrated) and the first alignment layer PI1 or the second alignment layer PI2. Thereafter, in an environment close to vacuum, one of the first and the second substrates 110 and 120 is moved close to another one of the first and the second substrates 110 and 120, so that the first and the second substrates are connected to each other through the sealant in order to seal the display medium composition MX in between the first and the second alignment layers PI1 and PI2 of the first and the second substrates 110 and 120. In brief, the one drop fill (ODF)

method may be used fill in the display medium composition MX. However, the invention is not limited thereto. In other embodiments, the display medium composition MX may also filled in by using the LC injection or other suitable methods.

Figure 2A:
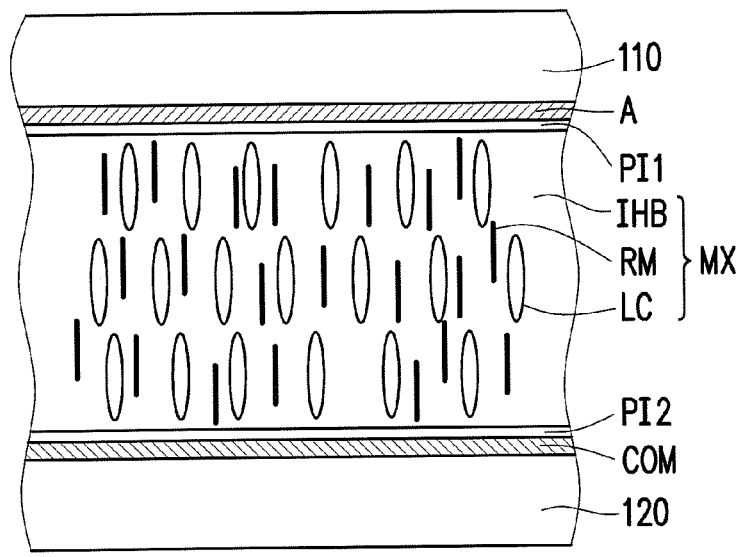
FIG. 2A to FIG. 2D are cross-sectional diagrams illustrating the manufacturing method of display panel according to an embodiment of the invention.
Figure 2B:
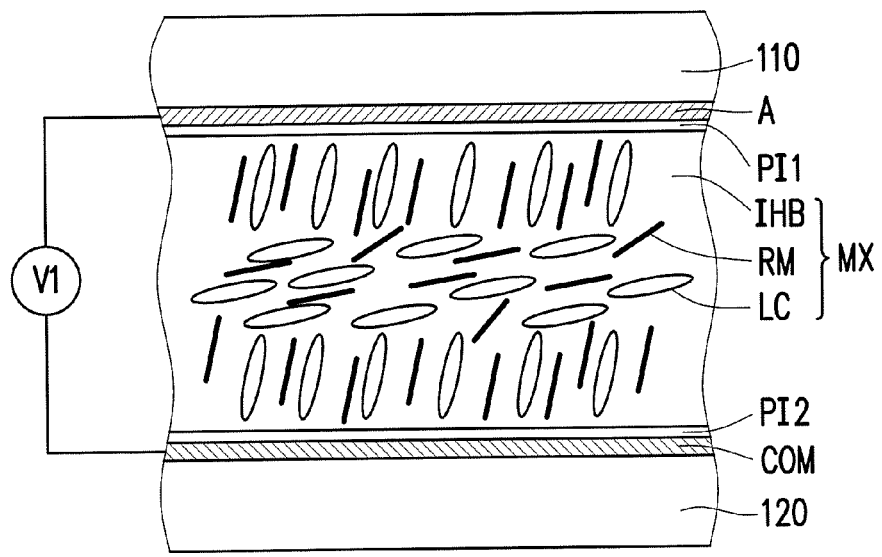
Figure 2C:
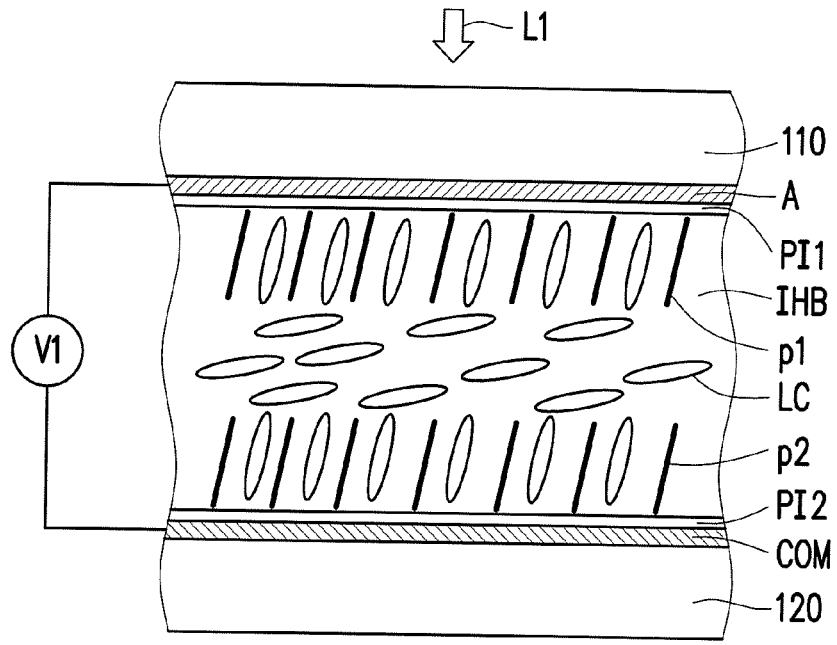
Figure 2D:
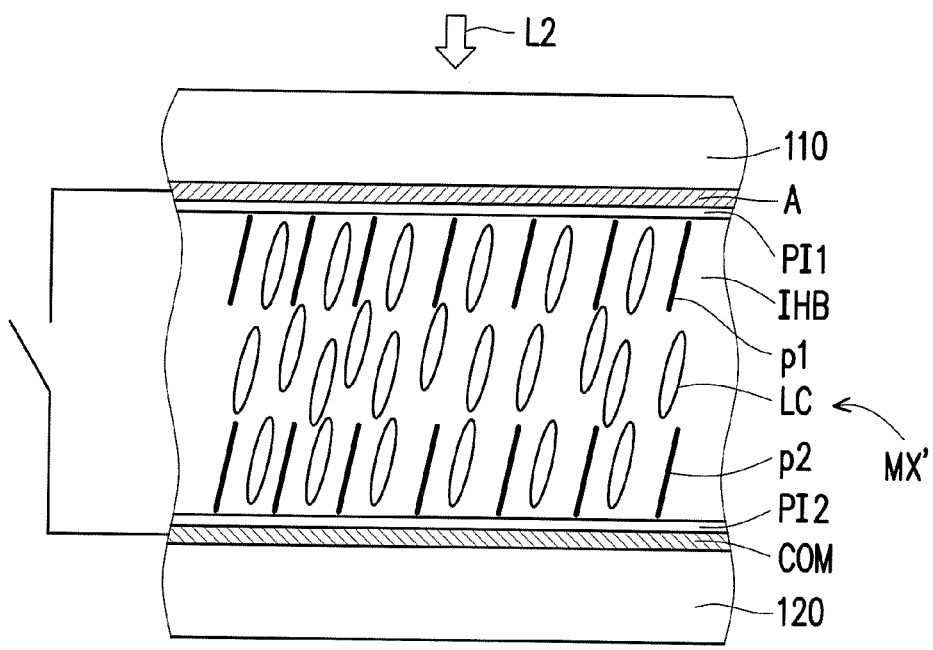

Referring to FIG. 2B and FIG. 2C, subsequently, the first curing is conducted, and the first curing includes conducting an irradiation step and applying a first voltage V1 to the pixel array A simultaneously. To be specific, as shown in FIG. 2B, the display panel further includes a common electrode COM. In the present embodiment, the pixel array A and the common electrode COM may be electrically connected to a function generator, so that the first voltage V1 may be provided between the pixel array A and the common electrode COM. Under the influence of the first voltage V1, the positive-type or negative-type liquid crystal material LC may include specified azimuthal angle and pre-tile angle. As shown in FIG. 2C, subsequently, the irradiation step is conducted while maintaining the first voltage V1 so that the positive-type or negative-type liquid crystal material LC includes the specified azimuthal angle and pre-tile angle. At this time, the reactive monomer RM conducts a step-wise polymerization and a separation along the specified azimuthal angle and pre-tile angle of the liquid crystal material LC, so that high-molecular polymers are formed on the first and the second alignment layers PI1 and PI2. As shown in FIG. 2D, with use of the high-molecular polymers, after the first voltage V1 is removed, the positive-type or negative-type liquid crystal material LC can still generate the desired azimuthal angle and pre-tile angle along an arrangement direction of the high-molecular polymers. In the present embodiment, a wavelength of a light beam L1 in the irradiation step of the first curing may range from 200 nm to 450 nm. For instance, a primary wavelength of the light beam L1 may be 365 nm. An irradiation time of the light beam L1 may range from 0 minute to 10 minutes (e.g., 15 seconds or 240 seconds). An irradiation energy of the light beam L1 may range from 0 mW/cm$^2$ to 150 mW/cm$^2$ (e.g., 100 mW/cm$^2$ or 4 mW/cm$^2$). The first voltage V1 applied in the first curing may range from 0V to 30V (e.g., 15V or 2.7V). However, the invention is not limited thereto. The wavelength, the irradiation time and the irradiation energy of the light beam L1 and the first voltage V1 can all be properly adjusted according to actual requirements.

Referring to FIG. 2D, subsequently, the second curing is conducted to complete a display panel 100. The second curing can cause more of the reactive monomer RM remained at the middle of the liquid crystal material LC to conduct a polymerization reaction, so as to form a plurality of first alignment particles p1 on the first alignment layer PI1 and form a plurality of second alignment particles p2 on the second alignment layer PI2. In the present embodiment, an irradiation step can be conducted while the first voltage V1 is selectively removed (i.e., no voltage is applied). A wavelength of a light beam L2 in the irradiation step of the second curing may range from 200 nm to 450 nm. For instance, a primary wavelength of the light beam L2 may be 365 nm. An irradiation time of the light beam L2 may range from 0 minute to 180 minutes (e.g., 75 seconds or 420 seconds). An irradiation energy of the light beam L2 may range from 0 mW/cm$^2$ to 150 mW/cm$^2$ (e.g., 100 mW/cm$^2$ or 4 mW/cm$^2$). However, the invention is not limited thereto. The wavelength, the irradiation time and the irradiation energy of the light beam L2 as well as whether to apply the voltage can all be properly set according to actual requirements.

Referring to FIG. 2D, the display panel 100 includes the first substrate 110, the pixel array A disposed on the first substrate 110, the first alignment layer PI1 covering the pixel array A, the second substrate 110 disposed opposite the first substrate 120, the second alignment layer PI2 disposed on the second substrate 120 and a display medium MX' disposed between the first alignment layer PI1 and the second alignment layer PI2. The display medium MX' is a liquid remained after conducting the second curing on the display medium MX. The display medium MX' at least includes the positive-type or negative-type liquid crystal material.

Figure 3:
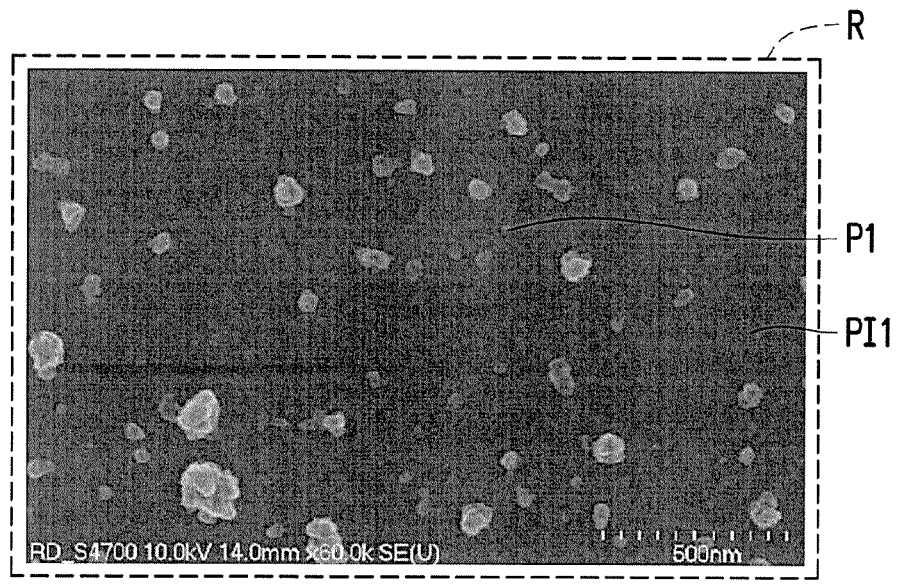
FIG. 3 is a top view of the first alignment layer and the first alignment particles in the unit area of FIG. 2D.

FIG. 3 is a top view of the first alignment layer and the first alignment particles in the unit area of FIG. 2D. Referring FIG. 3, a number of the first alignment particles p1 each having an area ranged from 250 nm$^2$ to 1000 nm$^2$ occupies 40% or less of a total number of the first alignment particles p1 in a unit area R. More specifically, in the present embodiment, the number of the first alignment particles p1 each having the area ranged from 250 nm$^2$ to 1000 nm$^2$ occupies 20% to 40% (e.g., 30%, but the invention is not limited thereto) of the total number of the first alignment particles p1 in the unit area R. The number of the first alignment particles p1 each having an area ranged from 1000 nm$^2$ to 2000 nm$^2$ occupies 15% to 30% (e.g., 25%, but the invention is not limited thereto) of the total number of the first alignment particles p1 in the unit area R. The number of the first alignment particles p1 each having an area ranged from 2000 nm$^2$ to 3000 nm$^2$ occupies 10% to 25% (e.g., 17%, but the invention is not limited thereto) of the total number of the first alignment particles p1 in the unit area R. The number of the first alignment particles p1 each having an area ranged from 3000 nm$^2$ to 4000 nm$^2$ occupies 5% to 15% (e.g., 10%, but the invention is not limited thereto) of the total number of the first alignment particles p1 in the unit area R. The number of the first alignment particles p1 each having an area equal to or greater than 5000 nm$^2$ occupies 10% to 25% (e.g., 18%, but the invention is not limited thereto) of the total number of the first alignment particles p1 in the unit area R.

In the present embodiment, the unit area R can refer to a shooting range (e.g., approximately $3.15 \times 10^{-6}$ nm$^2$) of a scanning electron microscope (SEM). A method of calculating the number of the first alignment particles p1 for each area range may include: inputting image information captured by the scanning electron microscope in a computer, and analyzing the number of the first alignment particles p1 for each area range by software of the computer, so as to calculate a rate of the number the first alignment particles p1 within the respective area range to the total number of the first alignment particles p1. However, the invention is not limited thereto. In other embodiments, the unit area may also be other suitable sizes, and the rate of the number the first alignment particles p1 within the respective area range to the total number of the first alignment particles p1 may also be calculated by other methods.

Figure 4:
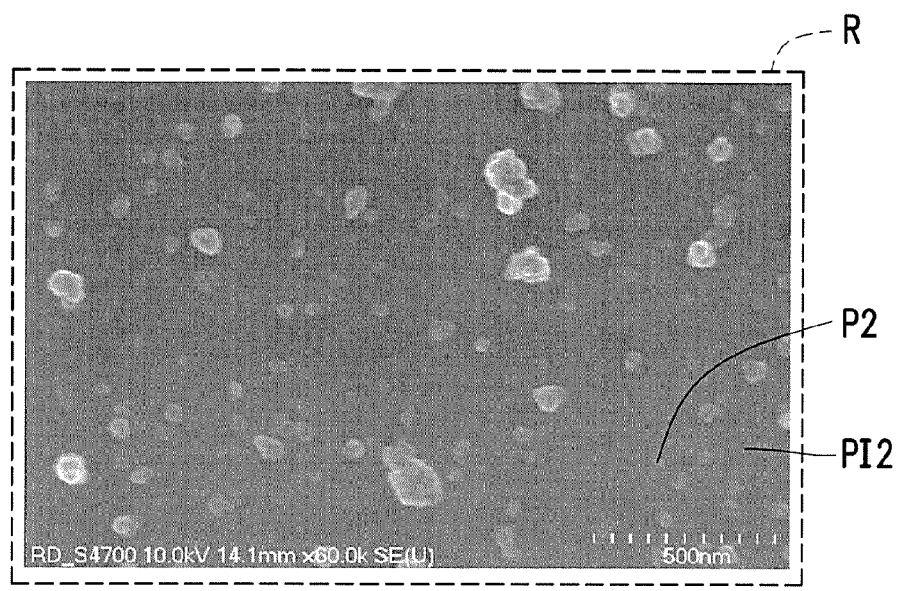
FIG. 4 is a top view of the second alignment layer and the second alignment particles in the unit area of FIG. 2D.

FIG. 4 is a top view of the second alignment layer and the second alignment particles in the unit area of FIG. 2D. Referring FIG. 4, a number of the second alignment particles p2 each having the area ranged from 250 nm$^2$ to 1000 nm$^2$ occupies 40% or less of a total number of the second alignment particles p2 in the unit area R. More specifically, in the present embodiment, the number of the second alignment particles p2 each having the area ranged from 250 nm$^2$ to 1000 nm$^2$ occupies 20% to 40% (e.g., 30%, but the invention is not limited thereto) of the total number of the second alignment particles p2 in the unit area R. The number of the second alignment particles p2 each having the area ranged from 1000 nm$^2$ to 2000 nm$^2$ occupies 15% to 30% (e.g., 25%, but the invention is not limited thereto) of the total number of the second alignment particles p2 in the unit area R. The number of the second alignment particles p2 each having the area ranged from 2000 $nm^2$ to 3000 $nm^2$ occupies 10% to 25% (e.g., 17%, but the invention is not limited thereto) of the total number of the second alignment particles p2 in the unit area R. The number of the second alignment particles p2 each having the area ranged from 3000 $nm^2$ to 4000 $nm^2$ occupies 5% to 15% (e.g., 10%, but the invention is not limited thereto) of the total number of the second alignment particles p2 in the unit area R. The number of the second alignment particles p2 each having the area equal to or greater than 5000 $nm^2$ occupies 10% to 25% (e.g., 18%, but the invention is not limited thereto) of the total number of the second alignment particles p2 in the unit area R. Similarly, the unit area R of FIG. 4 may also be determined by using aforesaid method, and a rate of the number of the second alignment particles p2 within the respective area range (e.g., 250 $nm^2$ to 1000 $nm^2$) to the total number of the second alignment particles p2 may also be calculated by using the aforesaid method, which is not repeated hereinafter.

number of the first alignment particles p1 in the unit area R, and the number of the second alignment particles p2 each having the area ranged from 250 $nm^2$ to 1000 $nm^2$ occupies more than 40% (e.g., 61.6%) of the total number of the second alignment particles p2 in the unit area R. In view of the falling times of the display panels with the numbering R and the numberings 1 to 4, the falling times of the display panels with the numberings 1 to 4 are shorter than the falling time of the display panel with the numbering R. In other words, in the resultant display panel 100, if the number of the first alignment particles p1 each having the area ranged from 250 $nm^2$ to 1000 $nm^2$ occupies 40% or less of the total number of the first alignment particles p1 in the unit area R, and the number of the second alignment particles p2 each having the area ranged from 250 $nm^2$ to 1000 $nm^2$ occupies 40% or less of the total number of the second alignment particles p2 in the unit area R, the falling time (a time required for the transmittance of the display panel 100 to change from 90% to 10%) of the display panel 100 is significantly shorter.

TABLE 2

| | Percentage by weight of the reactive monomer (%) | First curing | | | Second curing | | | Rate of the number of the first (or the second) alignment particles with the respective area range to the total number of the first (or the second) alignment particles (%) | | | | | Falling time (ms) |
|---|---|---|---|---|---|---|---|---|---|---|---|---|---|
| | | Voltage applied to the pixel array (V) | Irradiation energy (mW) | Irradiation time (sec) | Voltage applied to the pixel array (V) | Irradiation energy (mW) | Irradiation time (sec) | 250 $nm^2$ to 1000 $nm^2$ | 1000 $nm^2$ to 2000 $nm^2$ | 2000 $nm^2$ to 3000 $nm^2$ | 3000 $nm^2$ to 4000 $nm^2$ | greater than 4000 $nm^2$ | |
| R | 0.3 | 15 | 100 | 90 | 0 | 0 | 0 | 61 | 25.4 | 7.5 | 2 | 3.6 | 3.88 |
| 1 | 0.3 | 15 | 100 | 15 | 0 | 100 | 75 | 27.6 | 26.3 | 18.4 | 8.6 | 19.1 | 3.50 |
| 2 | 0.3 | 2.4 | 4 | 240 | 0 | 4 | 420 | 30.6 | 21.2 | 17.6 | 14.1 | 16.6 | 3.51 |
| 3 | 0.45 | 15 | 100 | 15 | 0 | 100 | 75 | 29.1 | 19.4 | 20.1 | 7.5 | 23.7 | 3.31 |
| 4 | 0.45 | 2.7 | 4 | 240 | 0 | 4 | 420 | 28.2 | 24.5 | 12.7 | 9.1 | 25.4 | 3.59 |

Referring to Table 2 below, a numbering "R" represents a display panel in a reference example, and the display panel of the reference example is manufactured without using the 2 step curing, and numberings 1 to 4 represent display panels according to various embodiments of the invention which are manufactured by using the 2 step curing. Table 2 lists the percent by weight of the reactive monomer RM before conducting the corresponding curing, the corresponding process conditions in the curing, the rate of the number of the first alignment particles P1 (the second alignment particles P2) to the total number of the first alignment particles p1 (the second alignment particles P2) in the unit area in a resultant display panel and the falling time of the display panel for each of the display panels with the numberings R and 1 to 4.

Referring to Table 2 below, for each of the display panels with the numberings 1 to 4 according to various embodiments of the invention, the number of the first alignment particles p1 each having the area ranged from 250 $nm^2$ to 1000 $nm^2$ occupies 40% or less of the total number of the first alignment particles p1 in the unit area R, and the number of the second alignment particles p2 each having the area ranged from 250 $nm^2$ to 1000 $nm^2$ occupies 40% or less of the total number of the second alignment particles p2 in the unit area R. For the display panel with the numbering R of the reference example, the number of the first alignment particles p1 each having the area ranged from 250 $nm^2$ to 1000 $nm^2$ occupies more than 40% (e.g., 61.6%) of the total In summary, in the resultant display panel manufactured by using the 2 step curing provided in the manufacturing method of display panel according to an embodiment of the invention, the number of the first alignment particles each having the area ranged from 250 $nm^2$ to 1000 $nm^2$ occupies 40% or less of the total number of the first alignment particles in the unit area, and the number of the second alignment particles each having the area ranged from 250 $nm^2$ to 1000 $nm^2$ occupies 40% or less of the total number of the second alignment particles in the unit area. As a result, the falling time of the display panel is significantly shorter.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, comprising:
a first substrate;
a pixel array, disposed on the first substrate;
a first alignment layer, covering the pixel array and having a plurality of first alignment particles, wherein a number of the first alignment particles each having an area ranged from 250 $nm^2$ to 1000 $nm^2$ occupies 40% or less of a total number of the first alignment particles in a unit area;
a second substrate, disposed opposite the first substrate;
a second alignment layer, disposed on the second substrate and having a plurality of second alignment particles, wherein a number of the second alignment particles each having the area ranged from 250 $nm^2$ to 1000 $nm^2$ occupies 40% or less of a total number of the second alignment particles in the unit area;
a display medium, disposed between the first alignment layer and the second alignment layer.

2. The display panel according to claim 1, wherein
the number of the first alignment particles each having the area ranged from 250 $nm^2$ to 1000 $nm^2$ occupies 20% to 40% of the total number of the first alignment particles in the unit area, and
the number of the second alignment particles each having the area ranged from 250 $nm^2$ to 1000 $nm^2$ occupies 20% to 40% of the total number of the second alignment particles in the unit area.

3. The display panel according to claim 1, wherein
a number of the first alignment particles each having an area ranged from 1000 $nm^2$ to 2000 $nm^2$ occupies 15% to 30% of the total number of the first alignment particles in the unit area, and
a number of the second alignment particles each having the area ranged from 1000 $nm^2$ to 2000 $nm^2$ occupies 15% to 30% of the total number of the second alignment particles in the unit area.

4. The display panel according to claim 1, wherein
a number of the first alignment particles each having an area ranged from 2000 $nm^2$ to 3000 $nm^2$ occupies 10% to 25% of the total number of the first alignment particles in the unit area, and
a number of the second alignment particles each having the area ranged from 2000 $nm^2$ to 3000 $nm^2$ occupies 10% to 25% of the total number of the second alignment particles in the unit area.

5. The display panel according to claim 1, wherein
a number of the first alignment particles each having an area ranged from 3000 $nm^2$ to 4000 $nm^2$ occupies 5% to 15% of the total number of the first alignment particles in the unit area, and
a number of the second alignment particles each having the area ranged from 3000 $nm^2$ to 4000 $nm^2$ occupies 5% to 15% of the total number of the second alignment particles in the unit area.

6. The display panel according to claim 1, wherein
a number of the first alignment particles each having an area equal to or greater than 5000 $nm^2$ occupies 10% to 25% of the total number of the first alignment particles in the unit area, and
a number of the second alignment particles each having the area equal to or greater than 5000 $nm^2$ occupies 10% to 25% of the total number of the second alignment particles in the unit area.

7. A manufacturing method of the display panel according to claim 1, comprising:
forming the pixel array and the first alignment layer on the first substrate;
forming the second alignment layer on the second substrate;
preparing the display medium composition comprising a positive-type or negative-type liquid crystal material and a reactive monomer capable of conducting a polymerization reaction under an ultraviolet irradiation;
assembling the first substrate and the second substrate together, and filling the display medium composition between the first alignment layer of the first substrate and the second alignment layer of the second substrate;
conducting a first curing which comprises conducting an irradiation step and applying a first voltage to the pixel array simultaneously; and
conducting a second curing which comprises conducting an irradiation step so that the reactive monomer conducts the polymerization reaction to form the plurality of first alignment particles on the first alignment layer and form the plurality of second alignment particles on the second alignment layer.

8. The manufacturing method of display panel according to claim 7, wherein a wavelength of the irradiation step of the first curing ranges from 200 nm to 450 nm, a time of the irradiation step of the first curing ranges from 0 minute to 10 minutes, an irradiation energy of the irradiation step of the first curing ranges from 0 mW/$cm^2$ to 150 mW/$cm^2$, and the first voltage applied in the first curing ranges from 0V to 30V.

9. The manufacturing method of display panel according to claim 7, wherein a wavelength of the irradiation step of the second curing ranges from 200 nm to 450 nm, a time of the irradiation step of the second curing ranges from 0 minute to 180 minutes, an irradiation energy of the irradiation step of the second curing ranges from 0 mW/$cm^2$ to 150 mW/$cm^2$, and no voltage is applied in the second curing.

10. The manufacturing method of display panel according to claim 7, wherein the display medium composition further comprises an inhibitor, and a percent by weight of the reactive monomer ranges from 0.1% to 1%.

* * * * *